(12) United States Patent
Vito et al.

(10) Patent No.: US 9,118,824 B2
(45) Date of Patent: *Aug. 25, 2015

(54) PROMPTING APPARATUS

(71) Applicant: PROMPTBOX INTERNATIONAL LLC, San Rafael, CA (US)

(72) Inventors: Linda Vito, San Rafael, CA (US); Edmond Louis Dudkowski, Sausalito, CA (US)

(*) Notice: Subject to any disclaimer, the term of this patent is extended or adjusted under 35 U.S.C. 154(b) by 45 days.

This patent is subject to a terminal disclaimer.

(21) Appl. No.: 13/934,231

(22) Filed: Jul. 3, 2013

(65) Prior Publication Data
US 2014/0016030 A1    Jan. 16, 2014

Related U.S. Application Data

(63) Continuation-in-part of application No. 13/489,755, filed on Jun. 6, 2012, now Pat. No. 8,902,355.

(51) Int. Cl.
*H04N 5/225* (2006.01)
*H04N 5/222* (2006.01)

(52) U.S. Cl.
CPC ........... *H04N 5/2252* (2013.01); *H04N 5/2222* (2013.01)

(58) Field of Classification Search
CPC .............................. H04N 5/2251; H04N 5/222

USPC .......... 348/375, 722, 373; 353/119, 122, 103, 353/113

See application file for complete search history.

(56) References Cited

U.S. PATENT DOCUMENTS

| | | | | |
|---|---|---|---|---|
| 5,386,227 A * | 1/1995 | Zeper | ............................... | 348/61 |
| 5,790,194 A * | 8/1998 | Shimamura | ................... | 348/375 |
| 6,280,039 B1 * | 8/2001 | Barber | .......................... | 353/119 |
| 6,980,253 B1 * | 12/2005 | Matsui | ......................... | 348/375 |
| 2001/0050720 A1 * | 12/2001 | Karube et al. | ................. | 348/373 |
| 2002/0008774 A1 * | 1/2002 | Yata et al. | ..................... | 348/375 |
| 2002/0030758 A1 * | 3/2002 | Wasada | ......................... | 348/375 |
| 2007/0040912 A1 * | 2/2007 | Singer | ...................... | 348/207.99 |
| 2007/0206090 A1 * | 9/2007 | Barraud et al. | ............. | 348/14.02 |
| 2009/0256970 A1 * | 10/2009 | Bilbrey et al. | ................ | 348/722 |
| 2014/0218615 A1 * | 8/2014 | Williams, IV | ................ | 348/722 |

* cited by examiner

*Primary Examiner* — Nhan T Tran
*Assistant Examiner* — Chan Nguyen
(74) *Attorney, Agent, or Firm* — Dahyee Law Group; Leon E. Jew

(57) ABSTRACT

The invention provides a prompting apparatus comprising a prompting box and a mounting and adjusting assembly. The prompting box houses a two-way mirror and the lens of the camera. The prompting box includes a shell frame and a coupling means which enables a user to slide in a tablet device. The tablet device runs a prompting software application and the pre-designed text is displayed on the screen at a speed that the speaker feels comfortable to read.

7 Claims, 7 Drawing Sheets

100

PROMPTING APPARATUS

CROSS REFERENCE TO RELATED APPLICATION

This application is a continuation-in-part of, and claims the benefit of priority to, the U.S. patent application Ser. No. 13/489,755, entitled "Prompting System" filed on Jun. 6, 2012, the content of which is incorporated in its entirety by reference herein.

FIELD OF THE INVENTION

This invention generally relates to an autocue displaying device that prompts a person speaking with an electronic visual text of a speech or script. In particular, this invention relates to a prompting apparatus including a box which allows a user to use a tablet device as the apparatus' display, and a mounting assembly which allows the user to couple the box with a video camera or a camcorder by steps which are as simple as loosening and fastening few fasteners.

BACKGROUND OF THE INVENTION

A teleprompter is an assembly which enables on-camera talent to look directly into the lens of the camera and read a prepared script text that is generated by a computer software application that allows scrolling up of the text so the reader can keep up with the up-coming text as she reads aloud. The reader sees the text reflected from a two-way mirror and the audience can only sees the scene being shot by the camera through the two-way mirror.

Such type of prompters evolved from the days of cathode ray TV tube displays. As a result, they were heavy off-camera devices that had to be mounted below the front of the camera on a "sled" between the camera and the camera pan and tilt head, which is then mounted on a tripod. Typically these prompters were heavy and time-consuming to mount and operate. Usually it takes a professional about 30 minutes to set-up, align, balance and trim and connect to a personal computer.

With the availability of small size, low-cost and light-weight LCD displays and tablet devices, it is now possible to design and build a prompter that is lightweight, mounts in a more industry standard manner and is very quick to mount, set-up and use.

It is an object of the present invention to provide a simple, lightweight, compact yet effective prompting apparatus that enables a speaker to look directing into a camera's lens which is hidden behind a prompting mirror and invisible to the speaker, and at the same time read the textual or other information shown on the prompting mirror, and that can be easily coupled with a video camera or a camcorder which has an accessory adapter shoe on its top.

It is a further object of the present invention to provide a prompting apparatus with a shrouded chamber immediately behind an inclined prompting mirror and the camera's lens is positioned in the chamber and behind the mirror such that unwanted light is blocked from entering the camera's lens and the best quality of the recorded images by the camera can be reached.

It is a still further object of the present invention to provide a prompting apparatus using a tablet device facing down to the prompting mirror, which is positioned at a 45 degree angle to the display screen of the tablet device, such that unwanted light from the light sources above the apparatus can be blocked from directly shining on the display screen.

It is an additional object of the present invention to provide a prompting apparatus with a housing in which the tablet can be conveniently positioned as a ceiling facing down to the prompting mirror, which is positioned at a 45 degree angle to the tablet device's display screen, such that the interference on the display screen and the prompting mirror caused by unwanted light is minimized and the clarity of the images on the prompting mirror viewed by the speaker is maximized.

It is yet another object of the present invention to provide a mounting and adjustment assembly which enables a user to couple the prompting apparatus to a video camera or a camcorder which has an accessory adapter shoe on its top.

SUMMARY OF THE INVENTION

The prompting apparatus according to the present invention includes a prompting box and a universal mounting assembly to allow adjustment and mounting to most medium sized camcorders or video cameras.

The prompter box includes a see-through mirror and a housing which includes a member for holding a tablet device facing down to the mirror. The prompting box has an open front, two opposite shrouding walls, a shrouding bottom, and a rear shrouding wall. The see-through mirror, which is approximately 40~60% reflective and 30~40% transparent, is securely held in position at a 45 degree angle to the screen surface of the tablet device. The rear shrouding wall has a round opening, or called through-hole, for placing the camera's lens.

The mounting assembly includes a vertical adjustment column, an elongate adjustment arm, two thumb screws for coupling the elongate adjustment arm with the vertical adjustment column, one thumb screw for coupling the vertical adjustment column with the top of the box, and an upright mounting bracket which is sub-assembly including two thumb screws and an upright shaft or bracket with a rectangular or square flat base which is for coupling with an accessory adapter shoe on the camera's top. The vertical adjustment column is secured to the top of the housing by one or two thumb screws against a stud which can be coupled with the top of the box. The elongate adjustment arm has a slot along its length direction.

In a typical configuration, the elongate adjustment arm is secured to the vertical adjustment column by two thumb screws which are perpendicular to each other. The vertical adjustment column is secured to the box through the thumb screws and the stud inserted in a slot on the top of the box. The camera is secured to the elongate adjustment arm through the thumb screws and the upright bracket. The bracket's upper portion is inserted into the slot on the elongate adjustment arm and moved horizontally in the slot until its flat base is aligned with the video camera's accessory adapter shoe. The thumb screws are then fastened to secure the camera to the elongate adjustment arm.

DETAILED DESCRIPTION OF THE INVENTION

Figure 1:
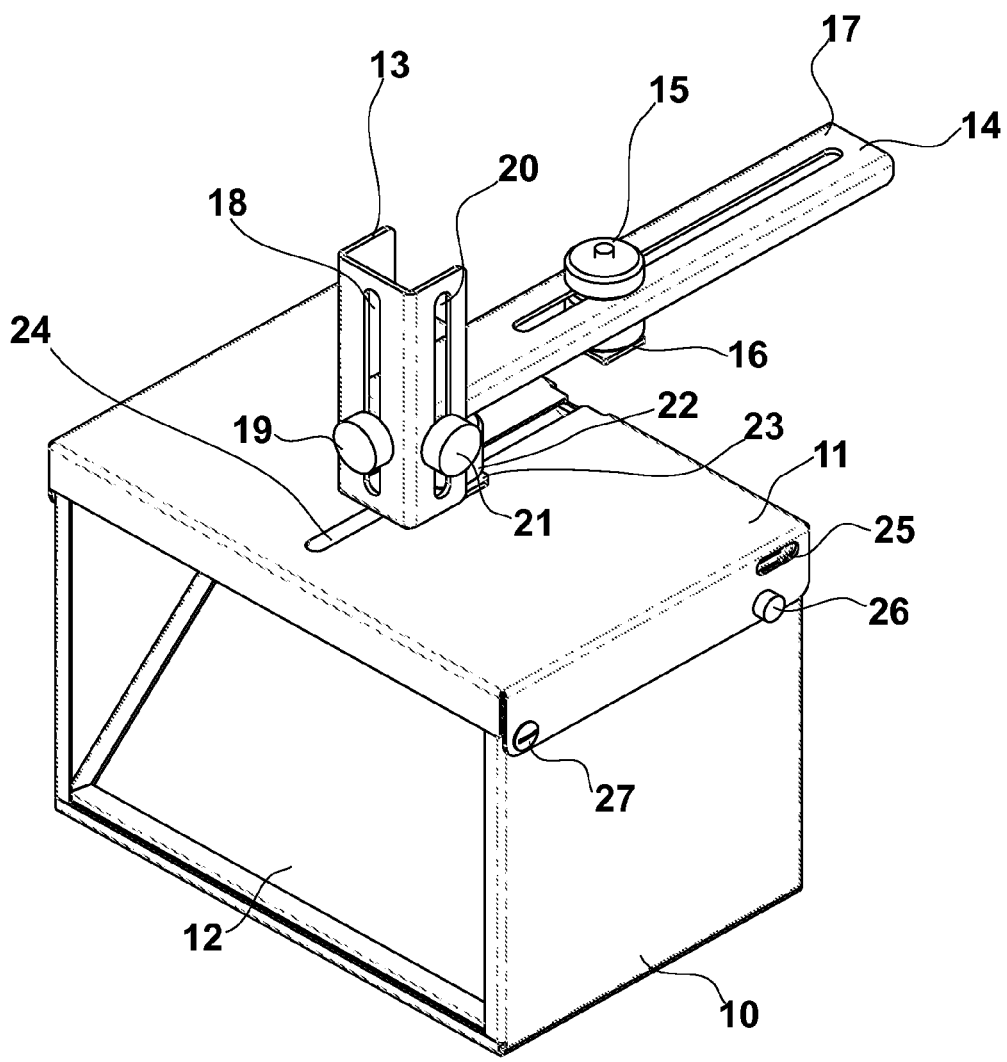
FIG. 1A is a schematic diagram illustrating a first perspective view of a typical embodiment of the prompting apparatus according to the present invention which includes a prompting box and a mounting and adjusting assembly coupled thereto.
FIG. 1B is a schematic diagram illustrating a second perspective view of the apparatus of FIG. 1B.
Figure 1:
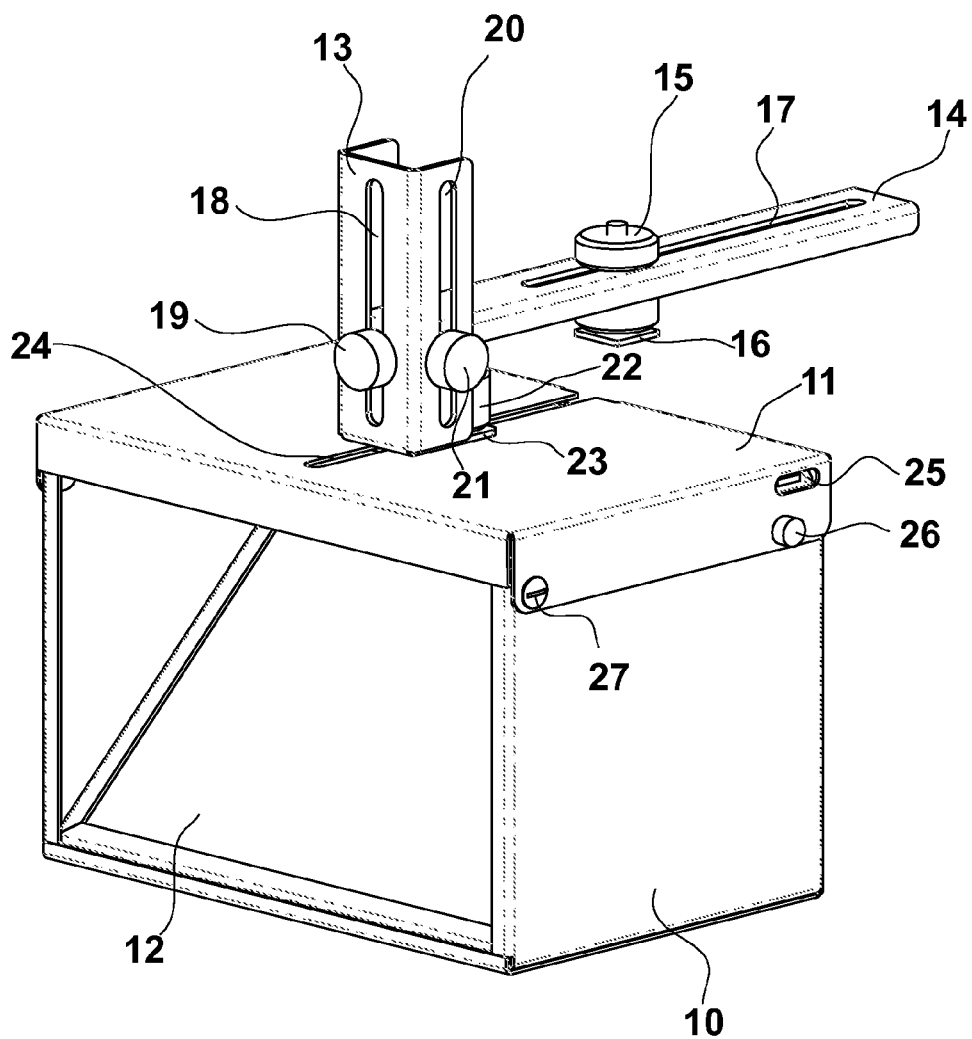

While the present invention may be embodied in many different shapes, forms, designs or configurations, for the purpose of promoting an understanding of the principles of the invention, reference will be made to the embodiments illustrated in the drawings and specific language will be used to describe the same. It will nevertheless be understood that no limitation of the scope of the invention is thereby intended. Any alterations and further implementations of the principle, the essence or the spirit of the invention as described herein are contemplated as would normally occur to one skilled in the art to which the invention relates.

The apparatus according to this invention includes a prompter unit and a mounting and adjusting assembly for coupling the prompter unit to a video camera or a camcorder, herein after referred to as a camera, which has an accessory adapter shoe, usually called accessory shoe, on its top. The prompter unit, also called prompting box, includes an inclined two-way mirror which is placed in the inner space of the box, and a tablet device which is placed inside the space defined by the top of the box with its display screen facing toward the mirror. The tablet device's display screen is preferably at 45 degree angle to the mirror. The optical image on the tablet device's display screen is shown on the two-way mirror and then reflected to the eyes of a speaker who looks into the mirror. The lens of the camera is placed in the back of the mirror. Because of reflection, only the images from the speaker's direction may enter the lens.

Figure 6:
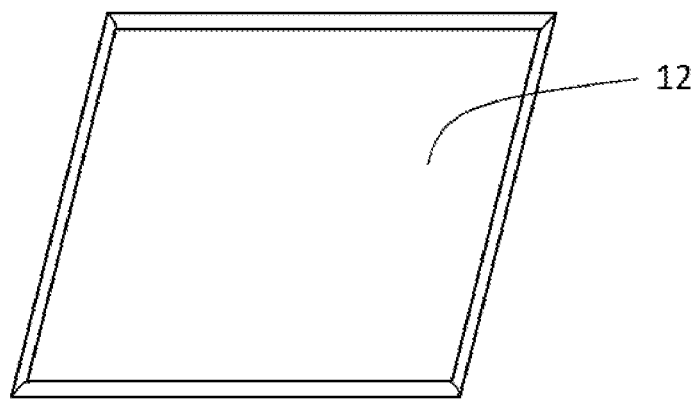
FIG. 6 is a schematic diagram illustrating a perspective view of a mirror used in the apparatus according to FIG. 1A and FIG. 1B.

FIG. 1A and FIG. 1B illustrate a perspective view of a typical embodiment of the prompting apparatus according to the present invention. The tablet device is placed inside of the space defined by the top 11 of the box. The tablet device is not shown in FIG. 1A and FIG. 1B. The box includes a shell 10, which is further illustrated in FIG. 2, and the top 11, which is further illustrated in FIG. 3, and an inclined two-way mirror 12 which is placed in the shell 10. The mirror 12 is further illustrated in FIG. 6.

The inclined two-way mirror 12 is a see-through mirror with an optical grade of approximately 60~70% reflective and approximately 30~40% transparent. It is held in position at a 45 degree angle to the display screen of the tablet which is placed inside the space defined by the top 11. The reflective surface of the mirror 12 faces outward such that the speaker in front of the prompter box can read the textual image reflected from the tablet's display screen. The camera's lens is placed in the back of the mirror 12 but it is invisible to the speaker. Because the mirror is 30~40% transparent, the speaker's image can be caught by the lens and then recorded by the recording device attached to the camera. For the best recording quality, the lens' front surface is preferrably at a 45 degree angle to the inclined mirror 12.

Figure 2:
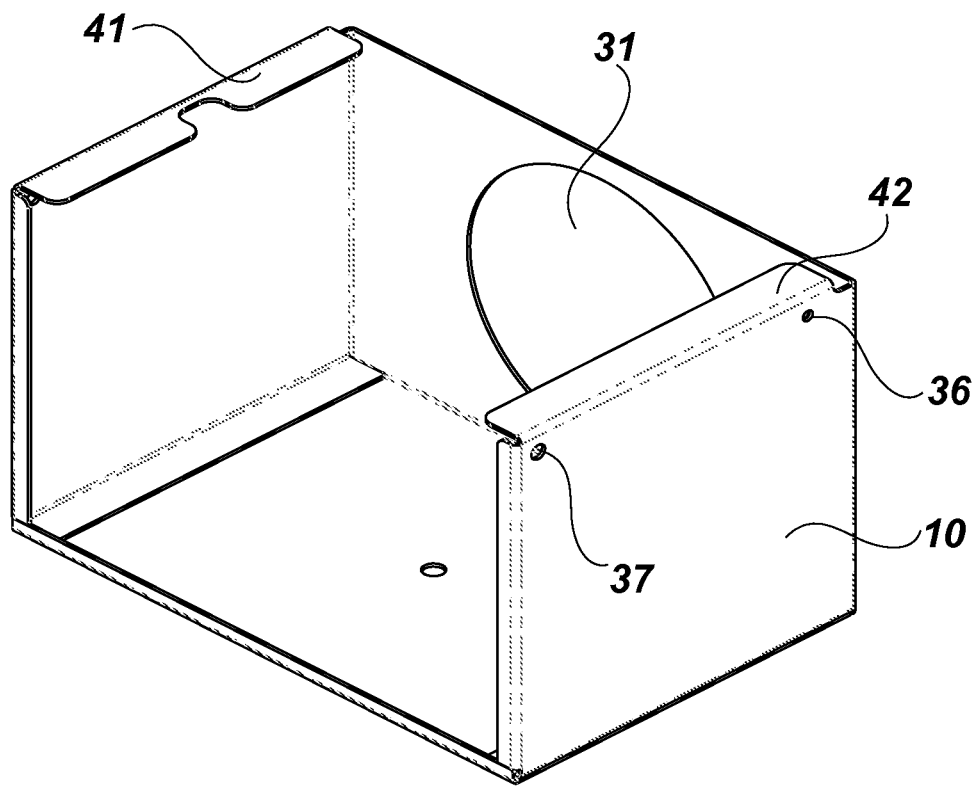
FIG. 2 is a schematic diagram illustrating a perspective view of a shell for the prompting box of the apparatus according to FIG. 1A and FIG. 1B.

The frame of the box, i.e. the shell 10 and the top 11, can be molded plastic pieces or metal pieces. In a typical configuration, as shown in FIG. 2, the box is in a shape of cube or rectangular cuboid and has two opposite side walls paralleling to each other, a bottom side perpendicular to the side walls, an open front and a rear wall. There is a round opening 31, also called through-hole, on the rear wall, through which the camera's lens is inserted, positioned and aligned. The top 11, when coupled to the shell 10, provides a space fitting for the tablet device. The inclined mirror 12 is in a square or a rectangular shape with a width which is substantially identical to the inner distance between the two opposite side walls of the shell 10. The mirror 12 is fixed to the side walls of the shell 10 using the existing art such as by inserting the mirror into two paralleling symmetric grooves embedded in the inner sides of the two opposite side walls. The mirror's lower edge is affixed to the front edge of the bottom of the shell 10. Preferably, the mirror's upper edge is fixed to the rear edge of the tablet device's display screen.

The inclined mirror 12, the two opposite side walls of the shell 10, the rear wall of the shell, and the display screen of the tablet device which is placed within the top 11 constitutes an inner chamber wherein the camera's lens resides. To block unwanted lights into the chamber, a flexible elastic collar or sleeve can be operatively attached around the round opening 31. After the lens is inserted into the inner chamber through the opening 31, the sleeve is internally attached to or locked on the camera, such that unwanted lights cannot enter the chamber from the gap between the round opening 31 and the camera.

The shell 10 and the top 11 jointly provide a framework to hold the tablet device, to hold the inclined mirror 12 in a proper position, to prevent unwanted lights from shedding on the inclined mirror 12, and to prevent unwanted lights from shedding on the camera's lens which is placed in the inner chamber and behind the inclined mirror 12.

Referring back to FIG. 1A and FIG. 1B, the top 11 is mechanically coupled to a mounting and adjusting assembly of hardware. The hardware assembly includes: (1) a vertical adjustment column 13 which is secured to the top 11 by a securing means such as by a thumb screw 22 and double-mount stud 23; (2) an elongate adjustment arm 14, which is vertically coupled to the vertical adjustment column 13 by a securing means such as by a first thumb screw 19 which can be adjusted vertically along the slot 18 in the column 13, and a second thumb screw 21 which can be adjusted vertically along the slot 20 in the column 13; and (3) an upright mounting bracket or a sub-assembly for securing a camera to the elongate adjustment arm 14. The sub-assembly includes a flat rectangular or square base 16 and a pair of fasteners such as the thumb fastener 15. The base 16 and the corresponding fastener are used for coupling with a camera's accessory adapter shoe. The sub-assembly can be slidably adjusted along the slot 17 in the elongate adjustment arm 14. In a typical configuration, the cross section of both the vertical column and the elongate arm is in "U" shape. The exterior width of the elongate arm is slightly narrower than the interior width of the vertical column such that the latter can be slid in the inner path of the former.

Figure 5:
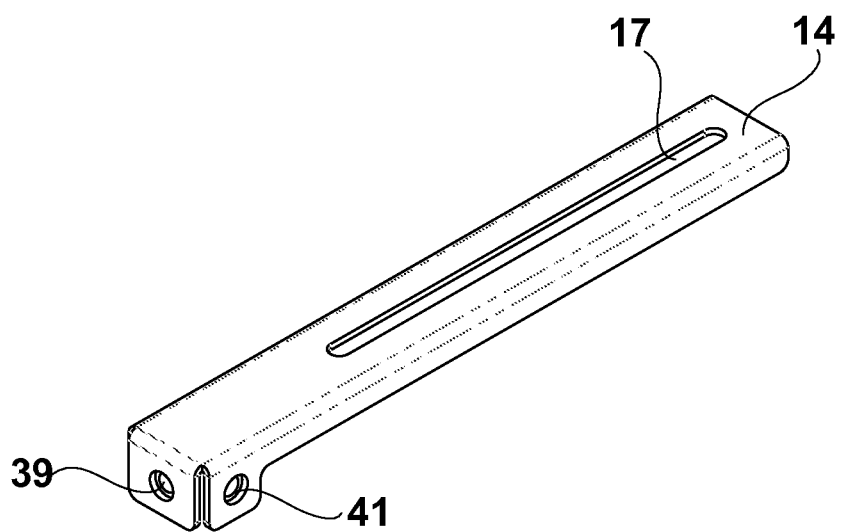
FIG. 5 is a schematic diagram illustrating a perspective view of an elongate adjustment arm used in the apparatus according to FIG. 1A and FIG. 1B.

Referring to FIG. 1A and FIG. 5, the thumb screw 19 is operably coupled to the female member 39 through thread. Similarly, the thumb screw 21 is operably coupled to the female member 41 through thread. The thumb screw 19 and thumb screw 20 are preferably perpendicular to each other.

Figure 3:
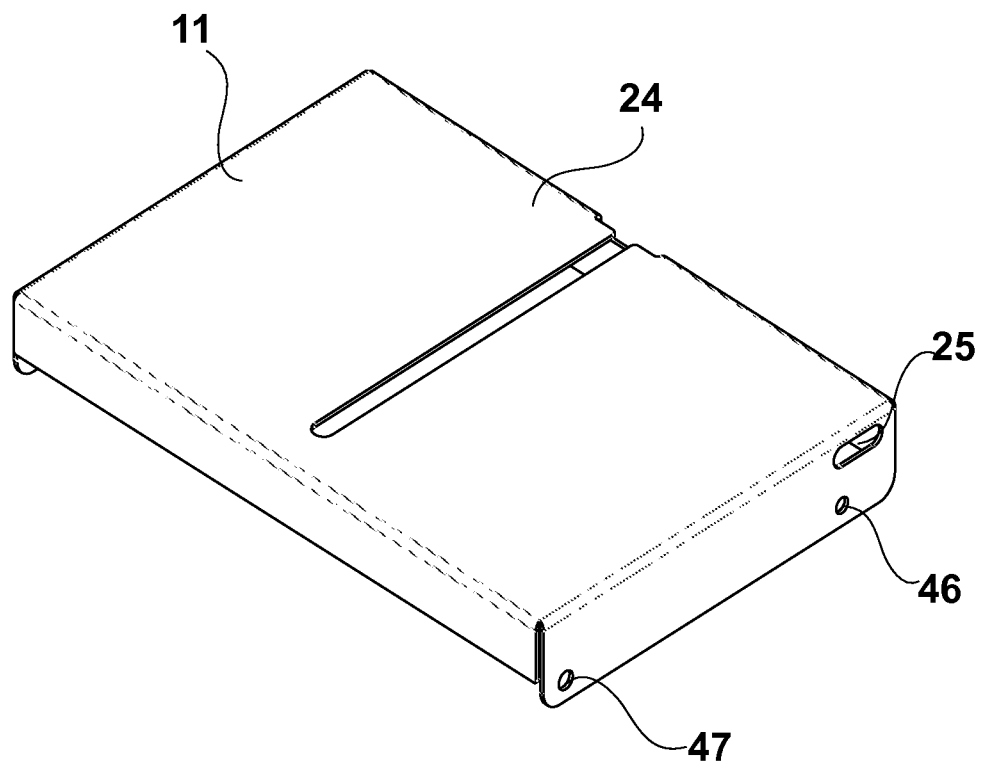
FIG. 3 is a schematic diagram illustrating a perspective view of a top cover of the prompting box of the apparatus according to FIG. 1A and FIG. 1B.
Figure 4:
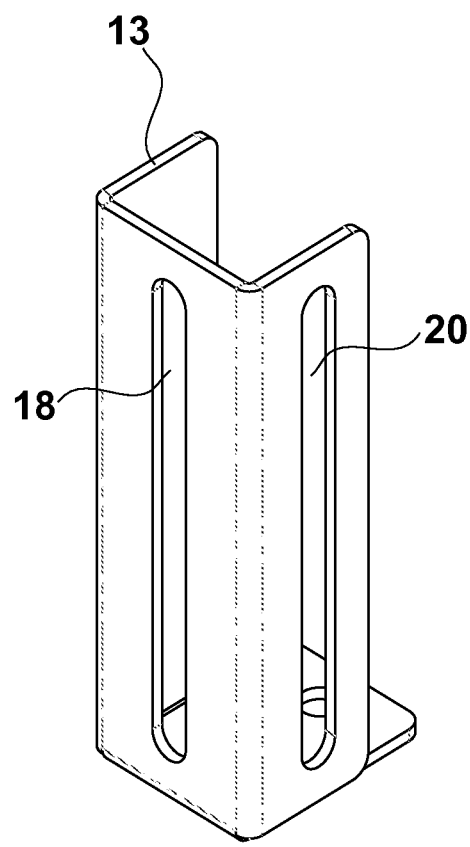
FIG. 4 is a schematic diagram illustrating a perspective view of a vertical adjustment column used in the apparatus according to FIG. 1A and FIG. 1B.

Now referring to FIG. 1A, FIG. 2 and FIG. 3, the top 11 can be opened via a hinging means such as a pair of screws symmetrically placed on the upper front of the side walls of the box. For example, screw 27 is operably coupled the top 11 to the shell 10 through the small through-hole 37 on the shell 10 and the small through-hole 47 on the top 11.

The top 11 can be locked by a click or snap means such as a pair of bolts symmetrically placed on the upper back of the side walls of the box. For example, bolt 26 is operably coupled the top 11 to the shell 10 through the small through-hole 36 on the shell 10 and the small through-hole 46 on the top 11. The top 11 also has an opening 25 for the user to operate the tablet's power button.

To avoid unwanted light reflection, the inner sides of the prompter's case, i.e. inner sides of the opposite walls, the inner side of the bottom and the inner side of the rear wall or back cover are coated or lined with an anti-reflection layer.

The hardware mounting and adjustment assembly described above can be further modified in several aspects without changing the spirit and scope of this invention.

In operation, the inverted textual image generated by a prompting software application is shown on the tablet device's display screen. Upon reflection, the speaker in front of the prompter can read the textual image in its normal format.

The pre-designed prompting text or other information is displayed on the display screen at a speed that the speaker feels comfortable to read. The unit may have a wireless remote control function which enables the speaker to adjust the moving speed of the script or images on the mirror.

While one or more embodiments of the present invention have been illustrated above, the skilled artisan will appreciate that modifications and adoptions to those embodiments may be made without departing from the scope and spirit of the present invention.

What is claimed is:

1. A prompting apparatus for coupling with a camera for video recording which has an accessory adapter shoe on its top, comprising:
    a rectangular cuboid housing with an open front defined by two opposite side walls, a bottom side, a top side, and a rear wall with a round opening for positioning and aligning said camera's lens;
    a flat see-through mirror being placed in said housing with its upper edge being attached to said top side's rear edge, its lower edge being attached to said bottom side's front edge, and its two side edges being attached to said two opposite side walls respectively such that said mirror and said housing forming a chamber where said lens is positioned and aligned behind said mirror; and
    a mounting and adjusting hardware assembly for coupling said housing with said camera through said accessory adapter shoe;
    wherein said top side is covering member which defines a space for placing a tablet device with its screen facing down at an angle of approximately 45 degrees from said mirror and in operation, image on said screen is reflected by said mirror to a speaker's eyes seeing into said mirror while light from said speaker passes through said mirror into said lens; and
    wherein said hardware assembly comprising a vertical adjustment column which is secured to said covering member's top, an elongate adjustment arm being operatively coupled with said vertical adjustment column to a necessary vertical height and held in place by a fastening means, and an upright bracket with its bottom end being operatively coupled and secured to said accessory adapter shoe and with its top end being operatively coupled with said elongate adjustment arm for adjusting a horizontal distance from said vertical adjustment column to said upright bracket.

2. The prompting apparatus of claim 1, wherein an elastic sleeve is coupled around and between said round opening and said camera to prevent unwanted lights from entering said chamber.

3. The prompting apparatus of claim 1, wherein inner surfaces of said two opposite side walls, said bottom side and said rear wall are coated with anti-reflection materials to prevent unwanted lights from reflecting into said mirror and said lens.

4. The prompting apparatus of claim 1, wherein said vertical adjustment column is secured to said covering member's top by at least one stud and one thumb screw.

5. The prompting apparatus of claim 1, wherein said fastening means comprises two slots on said vertical adjustment column, each for a thumb screw being operably secured to a female member on one end of said elongate adjustment arm.

6. The prompting apparatus of claim 1, wherein said elongate adjustment arm's exterior width is slightly narrower than said vertical adjustment column's interior width such that said elongate adjustment arm can be slid in an inner path of said vertical adjustment column.

7. A prompting apparatus for coupling with a video camera which has an accessory shoe on its top, comprising: a rectangular cuboid housing with an open front defined by two opposite side walls, a bottom side, a top side, and a rear wall with a round opening for positioning and aligning said camera's lens;
    a flat see-through mirror being placed in said housing with its upper edge being attached to said top side's rear edge, its lower edge being attached to said bottom side's front edge, and its two side edges being attached to said two opposite side walls respectively such that said mirror and said housing forming a chamber where said lens is positioned and aligned behind said mirror; and
    a mounting and adjusting hardware assembly for coupling said housing with said camera through said accessory shoe;
    wherein said top side is a covering member which defines a space fitting for holding a tablet device with its display screen facing down at an angle of approximately 45 degrees from said mirror and in operation, image on said screen is reflected by said mirror to a speaker's eyes seeing into said mirror while light from said speaker passes through said mirror into said lens;
    wherein an elastic sleeve is coupled around and between said round opening and said camera to prevent unwanted lights from entering said chamber;
    wherein inner surfaces of said two opposite side walls, said bottom side and said rear wall are coated with an anti-reflection layer to prevent unwanted lights from reflecting into said mirror and said lens;
    wherein said hardware assembly comprising a vertical adjustment column, an elongate adjustment arm which is secured to said vertical adjustment column at a necessary vertical height and held in place by at least one fastener, and an upright mounting bracket having a flat rectangular base which is to be operatively inserted into said accessory shoe and secured by one thumb screw, said upright mounting bracket's upper end being slideably coupled with said elongate adjustment arm along an elongate slot on said elongate adjustment arm's elongation direction for adjusting a horizontal distance from said vertical adjustment column to said upright mounting bracket.

* * * * *